(12) United States Patent
Begeja et al.

(10) Patent No.: US 10,133,752 B2
(45) Date of Patent: *Nov. 20, 2018

(54) DYNAMIC GLYPH-BASED SEARCH (71) Applicant: AT&T Intellectual Property I, L.P., Atlanta, GA (US)

(72) Inventors: Lee Begeja, Gillette, NJ (US); Robert J. Andres, Marietta, GA (US); David C. Gibbon, Lincroft, NJ (US); Steven Neil Tischer, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 450 days.

This patent is subject to a terminal disclaimer.

(21) Appl. No.: 14/553,008

(22) Filed: Nov. 25, 2014

(65) Prior Publication Data

US 2015/0082248 A1    Mar. 19, 2015

Related U.S. Application Data

(63) Continuation of application No. 13/347,318, filed on Jan. 10, 2012, now Pat. No. 8,924,890.

(51) Int. Cl.
*G06F 3/048* (2013.01)
*G06F 17/30* (2006.01)
(Continued)

(52) U.S. Cl.
CPC ...... *G06F 17/30244* (2013.01); *G06F 3/0482* (2013.01); *G06F 3/04817* (2013.01);
(Continued)

(58) Field of Classification Search
CPC ......... G06F 17/30244; G06F 17/30277; G06F 17/30823; G06F 17/30831; G06F 3/0482; G06F 3/04817; G06F 3/04842; G06F 8/34

See application file for complete search history.

(56) References Cited

U.S. PATENT DOCUMENTS 5,804,803 A    9/1998  Cragun et al.
5,930,783 A    7/1999  Li et al.
(Continued)

OTHER PUBLICATIONS

Miscellaneous Symbols (2009). The Unicode Standard, Version 5.2, Unicode, Inc. retrieved Aug. 14, 2018 from http://unicode.org/charts//PDF/Unicode-5.2/U52-2600.pdf. (Year: 2009).*

(Continued)

*Primary Examiner* — Kevin L Young
*Assistant Examiner* — Linda Huynh
(74) *Attorney, Agent, or Firm* — Chiesa Shahinian & Giantomasi PC (57) ABSTRACT

A method and apparatus for a dynamic glyph based search includes an image server. The image server analyzes images to determine the content of an image. The image and data related to the determined content of the image are stored in an image database. A user can access the image server and search images using search glyphs. In response to selection of a generic-search glyph, the image server finds related images in the image database and the images are displayed to the user. In addition, refine-search glyphs are displayed to a user based on the selected generic-search glyph. One or more refine-search glyphs can be selected by a user to further narrow a search to specific people, locations, objects, and other image content.

11 Claims, 4 Drawing Sheets

(51) Int. Cl.
   *G06F 3/0481* (2013.01)
   *G06F 3/0482* (2013.01)
   *G06F 3/0484* (2013.01)

(52) U.S. Cl.
   CPC .... *G06F 3/04842* (2013.01); *G06F 17/30047* (2013.01); *G06F 17/30277* (2013.01); *G06F 17/3043* (2013.01)

(56) References Cited

U.S. PATENT DOCUMENTS

| | | | |
|---|---|---|---|
| 6,999,636 | B1 | 2/2006 | Enokida et al. |
| 7,200,597 | B1 | 4/2007 | Grizzard |
| 7,374,077 | B2 | 5/2008 | Shimura |
| 2003/0135725 | A1* | 7/2003 | Schirmer .......... G06F 17/30648 712/300 |
| 2006/0227992 | A1* | 10/2006 | Rathus .............. G06F 17/30247 382/100 |
| 2007/0133947 | A1* | 6/2007 | Armitage .......... G06F 17/30256 386/224 |
| 2007/0157102 | A1* | 7/2007 | Hasegawa .......... G06F 3/04845 715/769 |
| 2007/0174790 | A1* | 7/2007 | Jing .................. G06F 17/30265 715/838 |
| 2007/0175998 | A1* | 8/2007 | Lev .................. G06F 17/30876 235/454 |
| 2007/0198340 | A1 | 8/2007 | Lucovsky et al. |
| 2008/0005105 | A1 | 1/2008 | Lawler et al. |
| 2008/0216022 | A1 | 9/2008 | Lorch et al. |
| 2008/0301128 | A1* | 12/2008 | Gandert ............ G06F 17/30265 |
| 2009/0070321 | A1* | 3/2009 | Apartsin ........... G06F 17/30967 |
| 2009/0254539 | A1* | 10/2009 | Wen .................. G06F 17/30247 |
| 2010/0064254 | A1* | 3/2010 | Atsmon ............ G06F 17/30247 715/810 |
| 2010/0070483 | A1 | 3/2010 | Delgo et al. |
| 2010/0070523 | A1 | 3/2010 | Delgo et al. |
| 2010/0070527 | A1* | 3/2010 | Chen .................. G06F 17/30781 707/772 |
| 2010/0262616 | A1* | 10/2010 | Eskolin ............. G06F 17/30247 707/769 |
| 2011/0038512 | A1* | 2/2011 | Petrou ............... G06F 17/30256 382/118 |
| 2011/0055203 | A1* | 3/2011 | Gutt .................. G06F 17/30274 707/722 |
| 2011/0129153 | A1* | 6/2011 | Petrou ............... G06F 17/30244 382/182 |
| 2012/0078936 | A1* | 3/2012 | Kuo .................. G06F 17/30867 707/766 |
| 2012/0162244 | A1* | 6/2012 | Ma .................... G06F 17/30277 345/594 |

OTHER PUBLICATIONS

Miscellaneous Symbols (2009), the Unicode Standard, Verison 5.2, Unicode, Inc., retrieved Mar. 13, 2013 from http://www.unicode.org/charts/PDF/Unicode-5.2/US52-2600.pdf.

* cited by examiner

| IMAGE ID 402 | DATE 404 | TIME 406 | MEDIA TYPE 408 | EVENT 410 | LOCATION 412 | PEOPLE PRESENT 414 | OBJECTS PRESENT 416 | LANDMARKS 418 | ENVIRONMENTAL CONDITIONS 420 |
|---|---|---|---|---|---|---|---|---|---|
| 1 | 7/4/2010 | 10:00pm | VIDEO | FIREWORKS | JERSEY CITY, NJ | EDWARD VOLKS; PETER CANNAL; DEBORAH WILX | FIREWORKS | NONE | OUTDOORS |
| 2 | 10/31/2009 | 8:00pm | IMAGE | HALLOWEEN | TARRYTOWN, NY | GILBERT NILE; PATRICIA DANKER | TOMBSTONES; GHOSTS; | KYKUIT | NIGHT |
| 3 | 8/9/2010 | 2:30pm | IMAGE | JENNIFER KAL'S BIRTHDAY | 76 32 20 W ,31 1 15 N | JENNIFER KAL; JOHN WARD; EDWARD VENKEL | CAKE; CANDLES; CUBICLES | NONE | INDOORS |
| 4 | 12/25/2009 | 6:03am | IMAGE | 12/25/2009 6:03am | WILKES BARRE, PA | DIETER STRUM; FELIX WEBBER; JOHN FALLS | CHRISTMAS TREE; PRESENTS; STOCKINGS | GREY MARBLE FIREPLACE | INDOORS |
| .... | .... | .... | .... | .... | .... | .... | .... | .... | .... |

DYNAMIC GLYPH-BASED SEARCH

This application is a continuation of U.S. patent application Ser. No. 13/347,318, filed Jan. 10, 2012, and issued on Dec. 30, 2014, as U.S. Pat. No. 8,924,890, which is incorporated by reference herein in its entirety.

FIELD OF THE DISCLOSURE

The present disclosure relates generally to searching electronic media such as text, images, videos, data, and other electronic information, and more particularly to a method for searching using a dynamic glyph-based search.

BACKGROUND

The storage capacity of digital cameras and the ability to download images to an electronic storage device allow users to take and store a large number of images and videos. This large number of images and videos are often stored on a storage device in a disorganized manner or in a manner not conducive to finding desired images.

For example, many cameras are configured to interface with associated image storage and modification software. The software often categorizes images and videos by date and time. Users can then find images and videos associated with a particular date by reviewing the contents of multiple folders. Although this provides a user with an organized categorization of images and videos, it does not allow a user to easily find specific desired images that span multiple dates and times.

SUMMARY

In one embodiment, a method for searching images comprises displaying a plurality of generic-search glyphs in which each of the plurality of generic-search glyphs represents a search type. User input is received identifying one or more of the generic-search glyphs and stored electronic media is displayed based on the selected generic-search glyphs. A plurality of refine-search glyphs are also displayed based on the indentified generic-search glyphs. User input is received identifying one of the plurality of refine-search glyphs and display of stored electronic media is updated based on the identified refine-search glyph. A search string generated based on the identified generic-search glyphs and the identified refine-search glyphs can be transmitted to another user.

An apparatus for performing the above method is also disclosed.

These and other advantages of the inventive concept will be apparent to those of ordinary skill in the art by reference to the following detailed description and the accompanying drawings.

DETAILED DESCRIPTION

Static images and video are often generated and stored digitally. For example, a user may generate images by taking photographs or videos (which are basically a sequence of images) with a digital camera. The storage capacity of memory devices for use with digital cameras (e.g., memory cards for insertion into a digital camera) allows a user to store thousands of images. Images stored on memory devices used with digital camera can be downloaded to a storage device (e.g., hard drive, non-volatile memory, or media drive) associated with a computer (i.e., a personal computer, laptop, net book, etc.) Images can also be downloaded or transferred to a server. The server may be local or remote to the computer and may be in communication with the computer via a network (e.g., wire line or wireless network).

Figure 1:
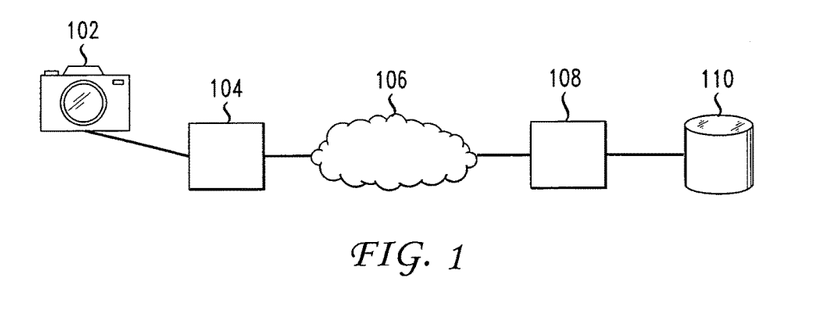
FIG. 1 depicts a network for facilitating transfer of images captured by a camera to a user device and/or a remote image server.

FIG. 1 depicts a network for facilitating transfer of images captured by a camera to a user device and/or a remote image server. The network also facilitates searching transferred images for particular images. In one embodiment, a user takes pictures or videos using camera 102. Camera 102 is any image capture device such as a still or video camera which generates a digital image. A user can download images from camera 102 to user device 104 which, in this embodiment, is a computer such as a desktop PC, laptop, or other computing device. User device 104 is connected via network 106 to image server 108. Network 106 can be any type of network such as a wire line or wireless network, a local area network or wide are network (e.g., the Internet). Images downloaded from camera 102 to user device 104 are typically categorized by the date and/or time the image was taken. Images downloaded to user device 104 can be transferred to image server 108 via network 106. Image server 108 is configured to analyze received images and store the images, as well as data generated by image analysis, in image database 110.

Image server 108 analyzes transferred images in order to identify image content displayed in the images. For example, image server 108 can determine the content of an image such as people, objects, locations, environmental conditions, etc. depicted in the image. Analysis of an image to identify image content displayed in the images is described in U.S. patent application Ser. No. 13/207,974, filed Aug. 11, 2011, titled "Method and Apparatus for Automated Analysis and Identification of a Person in Image and Video Content", which is incorporated by reference in its entirety herein. The image and data representing the determined content are stored, for example, in image database 110. It should be noted that image server 108 can acquire images in other ways such as scanned images or images imported from other image collections.

Storing an image and data representing determined content of the image allows a user to search for images based on image content. In one embodiment, a method facilitates image searching using glyphs.

A glyph, as used herein, is a symbol, image, or other representation of a search criteria or object. For example, a generic image of a person (e.g., a symbol representing a person such as a silhouette of a human's head and shoulders) may be used as a glyph representing a type of generic-search focusing on people (referred to as a person generic-search glyph). An image of several photographs or a still camera may be used as a glyph representing a type of generic-search focusing on still images (referred to as an image generic-search glyph). A glyph may also be an actual image from a photograph or a frame of a video captured by a user (e.g., a photograph or video taken by a user with a camera). For example, an actual image of a particular person, object, or location may be used as a glyph. As described in detail below, only glyphs used to further define a generic-search (such as a person generic-search) use actual images and are referred to as a refine-search glyphs.

Figure 2:
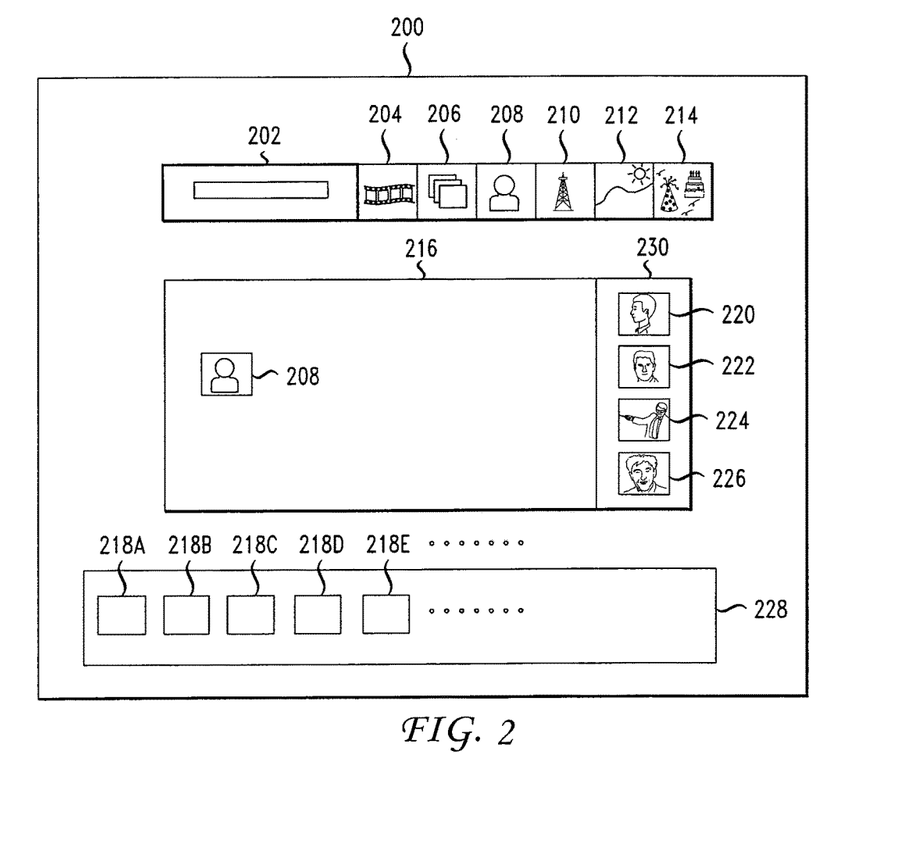
FIG. 2 depicts a user interface for facilitating searching of images.

FIG. 2 depicts a user interface 200 according to one embodiment for searching images using glyphs. A user can select (or identify) one or more generic-search glyphs (e.g. generic-search glyphs 202-214) by selecting and dragging each glyph to search area 216. Each of generic-search glyphs 202-214 represents a search criteria. Text glyph 202 represents a text based search and depicts a text box in which a user can enter keywords and phrases. Video glyph 204 comprises an image of a strip of film and is used in this example to represent a video search. Photo glyph 206 comprises an image of a plurality of photographs and represents a photo search. Person glyph 208 comprises a generic image of a person and represents a person search. Object glyph 210 comprises an image of an object, in this case the Eiffel Tower, and represents an object search. Location glyph 212 comprises a landscape scene and represents a location search. Event glyph 214 comprises images of a party hat, cake, and streamers and represents an event search. One or more of glyphs 202-214 can be selected and dragged into search area 216 by a user to generate a search for images.

Figure 3:
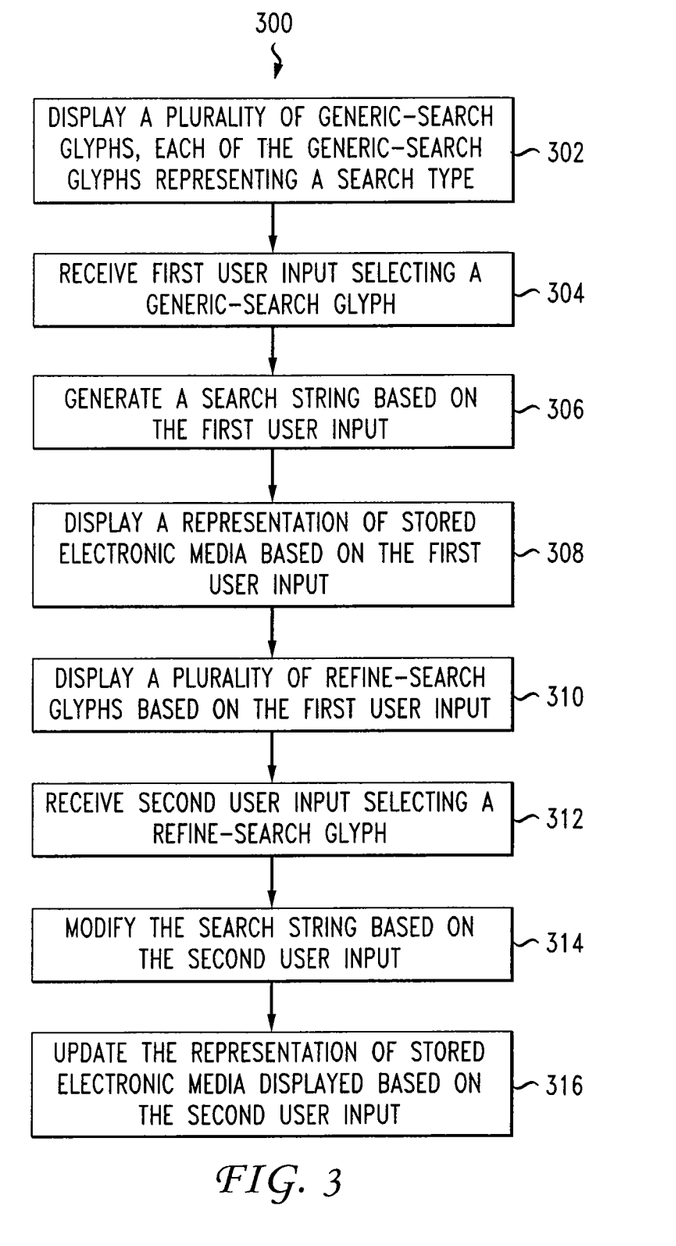
FIG. 3 depicts a flow chart of a method for searching electronic media.

FIG. 3 depicts a flow chart of a method 300 according to one embodiment in which a user searches electronic media, in this example, images and video, via user interface 200 (shown in FIG. 2) supported by a computer such as user device 104 (shown in FIG. 1). The electronic media searched may be stored in user device 104, image database 110, or both. At step 302 a plurality of generic-search glyphs (e.g., generic-search glyphs 202-214 as shown in FIG. 2) are displayed to a user via user device 104. Each of the plurality of generic-search glyphs represents a search type (e.g., text, video, image, person, etc.). At step 204 user input is received selecting (also referred to as identifying) one of the plurality of generic-search glyphs. For example, a user can select and drag one of generic-search glyphs 202-214 into search area 216. At step 306 a search string is generated based on the selecting one of the plurality of generic-search glyphs by the user. The search string defines the search based on the user selection of glyphs. In one embodiment, the search string is an alphanumeric string which defines the search criteria. The search string is used to query image database 110 to find images having associated data which corresponds to search criteria defined by the search string. At step 308 images (e.g. images 218A-218E) are displayed via user device 104 in image display area 228 based on the selecting one of the plurality of generic-search glyphs. Images to be displayed are determined based on the search criteria defined by the search string. For example, in response to a user selecting person generic-search glyph 208 (shown in FIG. 2), images depicting people are displayed as images 218A-218E in image display area 228. In this example, the people depicted in images 218A-218E are not constrained to any particular individuals since the generic-search string described above only defines that the search type is for a person. As such, in response to user selection of person generic-search glyph 208 by dragging glyph 208 into search area 216, images 218A-218E, each of which depict at least one person, are displayed in image display area 228.

A user can narrow the scope of the search to particular individuals by selecting one or more refine-search glyphs. A refine-search glyph is a glyph that more particularly describes a generic search criteria. For example, selection of a person generic-search glyph indicates that a user wants to search for people. Selection of a refine-search glyph indicates that a user wants to further define the generic search to one or more specific people the user wants to find images of. At step 310, a plurality of refine-search glyphs are displayed in refine-search glyph display area 230 based on the selecting one of the plurality of generic-search glyphs. The refine-search glyphs are chosen as appropriate depending on the generic-search glyphs chosen in step 304. For example, in response to a user selecting person generic-search glyph 208 by selecting and dragging the glyph into search area 216, a plurality of refine-search glyphs 220-226 are displayed in refine-search glyph display area 230. Each of the refine-search glyphs 220-226, in this case, comprises an image depicting a particular person as opposed to generic person search glyph 208 described above depicting a silhouette of a person's head and shoulders. As described, refine-search glyphs 220-226 allow a user to refine a generic person search by identifying particular people the user would like to find images of. For example, a user who wants to find images of Edward Volks would first select person search glyph 208 by dragging the glyph into search area 216. In response to the selection of person generic-search glyph 208, a plurality of appropriate refine-search glyphs (e.g., refine-search glyphs 220-226) are displayed in refine-search glyph display area 230. Each of refine-search glyphs 220-226 depicts an image of a particular person one of which is Edward Volks. The user selects Edward Volks by selecting the appropriate refine-search glyph (the one depicting an image of Edward Volks) and dragging the refine-search glyph into search area 216. In response to the selection of a refine-search glyph, representations of stored electronic media displayed in image display area 228 are updated to display electronic media, in this case images, determined to match search criteria as currently defined. Similarly, refine-search glyphs may be displayed and selected by a user to refine other types of searches such as event or location searches. For example, selection of a location generic-search glyph causes refine glyph display area to display refine-search glyphs depicting particular locations.

At step 312, user input selecting one of the plurality of refine-search glyphs is received. At step 314, the search string generated in step 306 is modified based on the user selecting one of the plurality of refine-search glyphs. At step 316, representations of stored electronic media displayed in image display area 228 are updated based on the user selecting one of the plurality of refine-search glyphs.

It should be noted that a user can select multiple generic-search glyphs 202-214 by repeatedly selecting and dragging generic-search glyphs into area 216. In addition, generic-search glyphs can be selected and removed from area 216. Each time a generic-search glyph is added to or removed from area 216, representations of electronic media displayed in image display area 228 are dynamically updated in order to reflect the addition or removal of glyphs from area 216. For example, in response to a user selecting a person generic-search glyph, images of people would be shown in image display area 228. In response to a user selecting a location generic-search glyph and a refine location glyph identifying the grand canyon, image display area 228 would be updated to display images of people at the grand canyon. If the location generic-search glyph is removed from search area 216, the location-refine-search glyph would be removed as well and image display area 228 would update to display images of people unconstrained by location.

The search string generated in step 306, in one embodiment, is an alphanumeric search string. For example, in response to a user selecting a person generic-search glyph, a search string such as "GlyphSearch/Person" would be generated. The search string is modified in step 314 in response to further selections by a user. For example, in response to a user subsequently selecting a refine-search glyph representing a particular person, namely, Edward Volks, the search string would be modified to include an identification of the particular person. The modified search string, in one embodiment, can be "GlyphSearch/Person: Edward.Volks" where "GlyphSearch" identifies the string as a search string, "/Person" identifies a person search, and "Edward.Volks" identifies a particular person for which images are to be searched for.

The length of search strings vary based on the number of glyph selections a user makes. For example, user selections of multiple search glyphs and refine-search glyphs can produce a search string such as "GlpyhSearch/Person:Edward.Volks;Deborah.Wilx/Location:Jersey.City,N.J./Object:Fireworks/Date:7/1/2010-7/7/2010/Media:Video" where "GlpyhSearch" identifies the string as a search string, "/Person:" identifies a person search, "Edward.Volks" and ";Deborah.Wilx" identify particular people, "/Location:" identifies a location search, "Jersey.City,N.J." identifies a particular location "/Object:" identifies an object search, "Fireworks" identifies a particular object, "/Date:" identifies a date search, "7/1/2010-7/7/2010" identifies a range of dates to be searched, "/Media:" identifies a media search, and "Video" identifies a particular type of media to be searched. Images having associated data which matches the criteria identified in a search string would be selected for display to a user.

Search strings can be saved for later use and also transmitted to other users. For example, a user who selects one or more search glyphs which produce desirable results (i.e., desired electronic media) can transmit the related generated search string to other users. The other users can then use the transmitted search strings to search images as well.

Method 300 depicted in FIG. 3 can be performed locally on user device 104 or remotely on image server 108. When method 300 is performed remotely on image server 108, user device 104 may be used to access image server 108 via network 106. In these remote access scenarios, image server 108 receives data from user device 104 via network 106. Image server 108 generates data that is transmitted to user device 104 via network 106 which causes user device 104 to perform operations defined by the generated data. Method 300 can be used to search images located on one of user device 104 and image database 110, or both.

Many different types of search glyphs can be displayed and selected by a user to define a search for electronic media. As described above in connection with step 302, search types designating text, video, images, people, objects, locations, and events are displayed as generic-search glyphs 202-214 in FIG. 2. Additional generic-search glyphs can be displayed as well to represent additional search types. For example, generic-search glyphs for search types such as keyword, phrase, specific date/time, range of dates/times, similar images, media type, geo-location, camera settings, image quality, etc. may be displayed along with or in place of the search glyphs previously described. Each generic-search glyph comprises an image associated with the search type a particular generic-search glyph represents. The image may be a generic image (i.e., a symbol generally recognized as representing a particular object or concept) or an actual image (such as images taken by a user) depicting, for example, an actual person, event, location, etc. For example, after selection of a person generic-search glyph, a user may be presented with a plurality of refine-search glyphs. The refine-search glyphs presented can comprise images of particular people obtained from images taken by a user. For example, each person refine-search glyph displayed in response to selecting a person generic-search glyph (depicted using a generic image) can comprise an actual image of a particular person. Other refine-search glyphs can use actual images as well. For example, refine-search glyphs associated with locations can comprise images of particular locations thereby providing a user with a visual indication of similar images which may be found by limiting the search to the particular refine-search glyph. Similarly, refine-search glyphs associated with specific events can comprise images of particular events thereby providing the user with a visual indication of similar images which may be found by limiting the search to the particular refine-search glyph.

Glyphs, in one embodiment, comprise modified versions of actual images. For example, extraneous detail can be removed from an image leaving only the parts of the image that are relevant. More specifically, if a glyph represents a birthday cake, the modified image could consist of just the cake with the background blacked out. Such simplification can make glyphs more easily identifiable, particularly if they are reduced in size or resolution.

In one embodiment, the previous selection of glyphs by a user can be used to modify the glyphs to be displayed in future searches. For example, if a user repeatedly selects glyphs representing specific people (e.g., family members), these prior user selections can be used to identify those specific people as being of interest to the user. When the user selects a generic-search glyph representing a search for people, refine-search glyphs identifying people previously searched for by the user (i.e., family members) can be displayed. Using prior user selections as feedback for modifying display of glyphs in future searches assists users in quickly locating media of interest.

Figure 4:
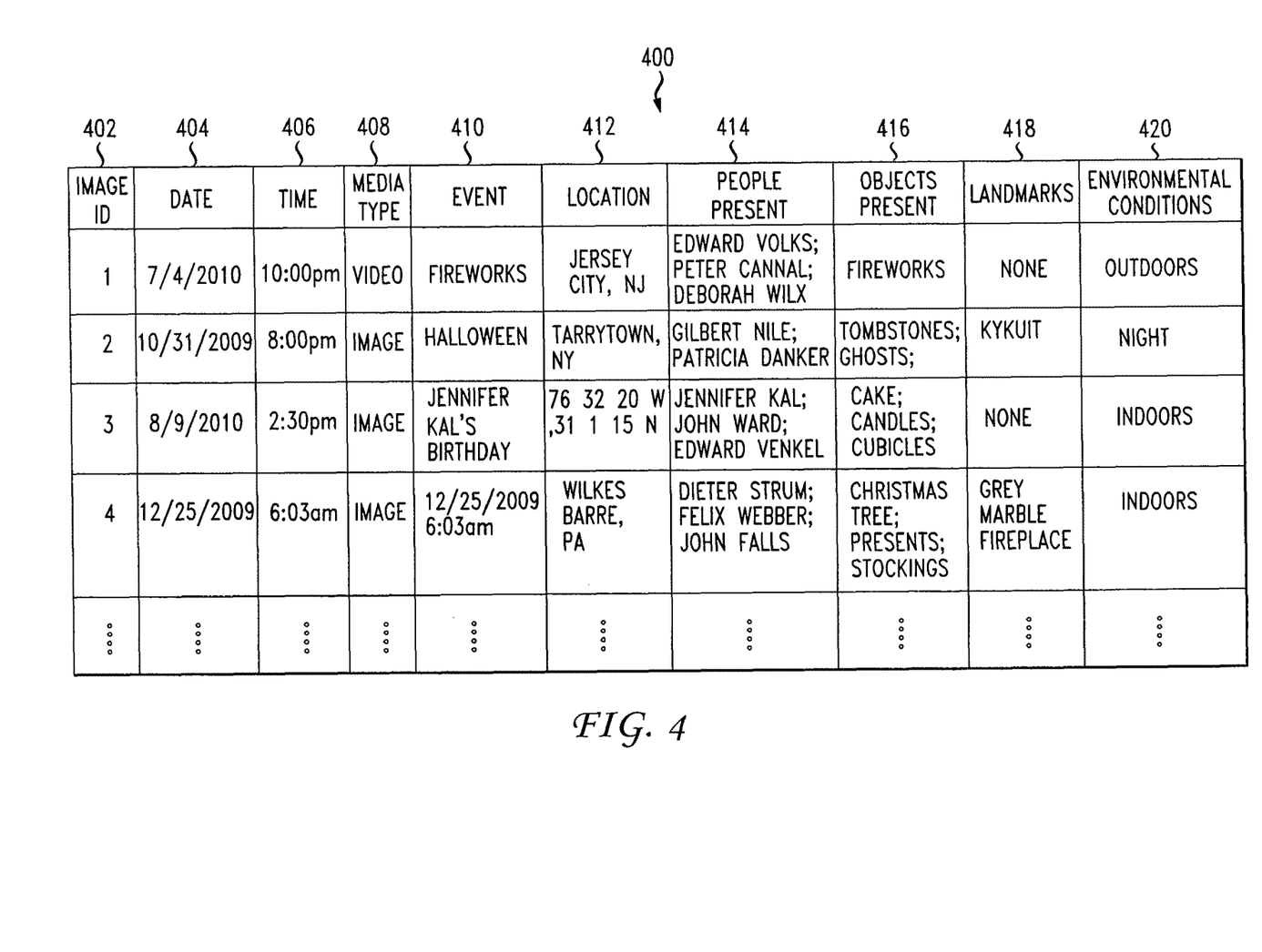
FIG. 4 depicts a table storing data associated with images in an image database.

FIG. 4 depicts image table 400 storing data associated with images in image database 110 (shown in FIG. 1). The data contained in the table, in one embodiment, includes information obtained from metadata associated with an image (e.g., date and time) as well as data determined based on analysis of an image (e.g. people present, objects present, etc) by image server 108 (shown in FIG. 1). Image ID 402 stores a unique image ID number which identifies a particular image stored in image database 110 and associated with the data. Date 404 and time 406 store the date and time an image was captured. Media type 408 stores information identifying the type of media a particular image is associated with (e.g., still image, referred to as an image, or video). Event 410 stores data indicating an event the image is determined to be associated with. Location 412 stores data indicating a location associated with an image (e.g., the location the image was taken). People present 414 and objects present 416 store data indicating one or more persons and objects shown in an image respectively. Landmarks 418 stores data indicating landmarks depicted in an image. Finally, environmental conditions 420 store data indicating the environmental conditions depicted in an image. Images to be displayed to a user are identified by comparing search criteria selected by a user via user interface 200 of FIG. 2 with image data contained in image table 400 of FIG. 4.

Returning to FIG. 2, images 218A-218E are displayed in image display area 228 based on user selections. For example, in response to a user selecting person search glyph 208, images 218A-218E are displayed in image display area 228 depicting images of people. Images 218A-218E can be arranged in several ways including by date/time the images were captured. Images displayed in image display area 228 are updated each time a user selects a search glyph or refine-search glyph. For example, after a user selects person search glyph 208, certain images, such as friends and relatives of the user, are selected for display as images 218A-218E. In response to a user selecting a refine-search glyph having an image of a particular person, images of the particular person are selected for display as images 218A-218E. Images 218A-218E are therefore dynamically updated in response to selections by a user.

Figure 5:
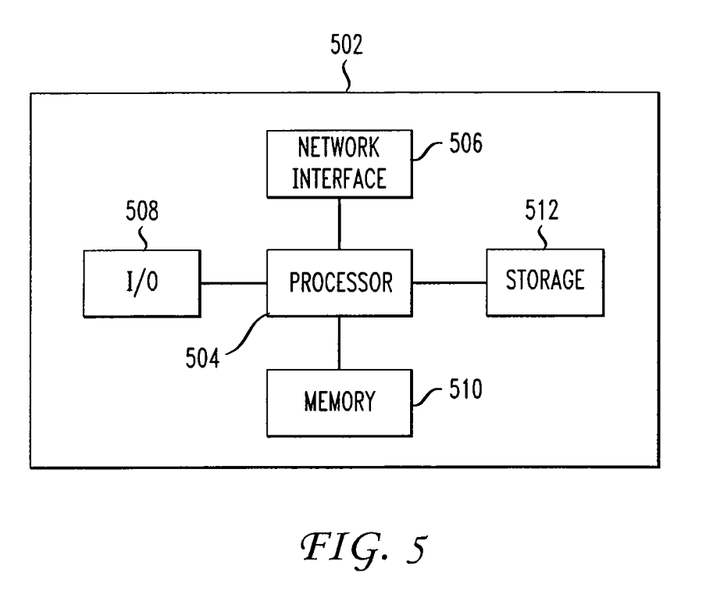
FIG. 5 depicts a high-level block diagram of a computer according to one embodiment.

User device 104, image server 108, and image database 110 and the methods depicted in FIG. 3 may be implemented using a computer. A high-level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the method steps of FIG. 3 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the method steps of FIG. 3. Accordingly, by executing the computer program instructions, the processor 504 executes an algorithm defined by the method steps of FIG. 3. The computer 502 also includes one or more network interfaces 506 for communicating with other devices via a network. The computer 502 also includes input/output devices 508 that enable user interaction with the computer 502 (e.g., display, keyboard, mouse, speakers, buttons, etc.) A display can be a cathode ray tube, liquid crystal display, light emitting diode display, or other type of apparatus for presenting information visually. One skilled in the art will recognize that an implementation of an actual computer could contain other components as well, and that FIG. 5 is a high level representation of some of the components of such a computer for illustrative purposes.

It should be noted that although the general inventive concept is described for use with images and video, the inventive concept can be applied to additional electronic media as well. Text, audio, phone messages, music, data and other electronic media may be searched by selecting generic-search glyphs and refine-search glyphs. The images displayed as glyphs for other types of media provide, in one embodiment, both an indication of the media type as well as an indication of the media content. For example, an image depicting a musician may be used to represent music performed by the musician.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for searching electronic media on an image server comprising:
   transmitting data representing a first plurality of glyphs for display at a user device, each of the first plurality of glyphs representing a search type;
   receiving data representing a first input identifying one of the first plurality of glyphs;
   modifying a plurality of stored images captured by a user to generate a plurality of refine-search glyphs, the modifying comprising:
      identifying parts of each of the plurality of stored images related to a subject of the respective refine-search glyph; and
      blacking out parts of each of the plurality of stored images not related to the subject of the respective refine-search glyph,
   wherein each of the plurality of refine-search glyphs narrows the one of the first plurality of glyphs to a particular subject of the one of the first plurality of glyphs;
   identifying a subset of the plurality of refine-search glyphs and data representing stored electronic media based on the first input;
   transmitting the data representing stored electronic media and the subset of the plurality of refine-search glyphs for display at the user device in response to the first input;
   receiving data representing a second input identifying one of the subset of the plurality of refine-search glyphs;
   identifying a portion of the stored electronic media based on the second input; and
   transmitting data identifying the portion of the stored electronic media for display at the user device in response to the second input.

2. The method of claim 1, further comprising:
   generating a search string based on the first input and the second input.

3. The method of claim 2, further comprising:
   transmitting the search string to a user in response to input requesting transmission of the search string.

4. The method of claim 1, wherein each of the first plurality of glyphs comprises an image representing the search type.

5. An apparatus comprising:
   a processor; and
   a memory to store computer program instructions, the computer program instructions when executed on a processor cause the processor to perform operations comprising:
      transmitting data representing a first plurality of glyphs for display at a user device, each of the first plurality of glyphs representing a search type;
      receiving data representing a first input identifying one of the first plurality of glyphs;
      modifying a plurality of stored images captured by a user to generate a plurality of refine-search glyphs, the modifying comprising:
         identifying parts of each of the plurality of stored images related to a subject of the respective refine-search glyph; and
         blacking out parts of each of the plurality of stored images not related to the subject of the respective refine-search glyph, wherein each of the plurality of refine-search glyphs narrows the one of the first plurality of glyphs to a particular subject of the one of the first plurality of glyphs;

identifying a subset of the plurality of refine-search glyphs and data representing stored electronic media based on the first input;

transmitting the data representing stored electronic media and the subset of the plurality of refine-search glyphs for display at the user device in response to the first input;

receiving data representing a second input identifying one of the subset of the plurality of refine-search glyphs;

identifying a portion of the stored electronic media based on the second input; and transmitting data identifying the portion of the stored electronic media for display at the user device in response to the second input.

6. The apparatus of claim 5, the operations further comprising:

generating a search string based on the first input and the second input.

7. The apparatus of claim 6, the operations further comprising:

transmitting the search string to a user in response to input requesting transmission of the search string.

8. The apparatus of claim 5, wherein each of the first plurality of glyphs comprises an image representing the search type.

9. A computer readable medium storing computer program instructions, which, when executed on a processor, cause the processor to perform operations comprising:

transmitting data representing a first plurality of glyphs for display at a user device, each of the first plurality of glyphs representing a search type;

receiving data representing a first input identifying one of the first plurality of glyphs;

modifying a plurality of stored images captured by a user to generate a plurality of refine-search glyphs, the modifying comprising:

identifying parts of each of the plurality of stored images related to a subject of the respective refine-search glyph; and blacking out parts of each of the plurality of stored images not related to the subject of the respective refine-search glyph, wherein each of the plurality of refine-search glyphs narrows the one of the first plurality of glyphs to a particular subject of the one of the first plurality of glyphs;

identifying a subset of the plurality of refine-search glyphs and data representing stored electronic media based on the first input;

transmitting the data representing stored electronic media and the subset of the plurality of refine-search glyphs for display at the user device in response to the first input;

receiving data representing a second input identifying one of the subset of the plurality of refine-search glyphs;

identifying a portion of the stored electronic media based on the second input; and transmitting data identifying the portion of the stored electronic media for display at the user device in response to the second input.

10. The computer readable medium of claim 9, the operations further comprising:

generating a search string based on the first input and the second input.

11. The computer readable medium of claim 10, the operations further comprising:

transmitting the search string to a user in response to input requesting transmission of the search string.

* * * * *